United States Patent
Tremblay

(10) Patent No.: US 11,459,966 B2
(45) Date of Patent: Oct. 4, 2022

(54) SYSTEMS AND METHODS FOR OPERATING AN ON-OFF VALVE

(71) Applicant: PRATT & WHITNEY CANADA CORP., Longueuil (CA)

(72) Inventor: Jason Tremblay, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 75 days.

(21) Appl. No.: 16/787,281

(22) Filed: Feb. 11, 2020

(65) Prior Publication Data
US 2021/0189983 A1  Jun. 24, 2021

Related U.S. Application Data

(60) Provisional application No. 62/951,493, filed on Dec. 20, 2019.

(51) Int. Cl.
*F02D 41/06* (2006.01)
*F02D 41/00* (2006.01)

(52) U.S. Cl.
CPC ....... *F02D 41/062* (2013.01); *F02D 41/0002* (2013.01); *F02D 41/0097* (2013.01); *F02D 41/061* (2013.01)

(58) Field of Classification Search
CPC ............. F01P 2007/146; F01P 2023/00; F01P 2025/08; F01P 3/20; F01P 7/16; F01P 7/167; F16K 11/0856; F16K 31/04; F02D 41/062; F02D 41/0002; F02D 41/0097; F02D 41/061
See application file for complete search history.

(56) References Cited

U.S. PATENT DOCUMENTS

| | | | |
|---|---|---|---|
| 6,357,219 B1 | 3/2002 | Dudd, Jr. et al. | |
| 10,040,577 B2 | 8/2018 | Teicholz et al. | |
| 2008/0082242 A1 | 4/2008 | Dell'Eva et al. | |
| 2010/0085676 A1 | 4/2010 | Wilfert | |
| 2015/0368685 A1 | 12/2015 | Brown et al. | |
| 2018/0066574 A1* | 3/2018 | Kawamura | F02D 23/00 |
| 2018/0112600 A1 | 4/2018 | Kelly et al. | |
| 2018/0142613 A1* | 5/2018 | Kurauchi | F02B 37/183 |
| 2018/0223738 A1* | 8/2018 | Greenberg | F02C 7/26 |
| 2018/0346100 A1* | 12/2018 | Veilleux, Jr. | F16K 31/055 |

FOREIGN PATENT DOCUMENTS

CN  105889603  8/2016

OTHER PUBLICATIONS

Extended European Search Report dated May 19, 2021, in counterpart European application No. 20215203.9.

* cited by examiner

*Primary Examiner* — Grant Moubry
*Assistant Examiner* — Ruben Picon-Feliciano
(74) *Attorney, Agent, or Firm* — Norton Rose Fulbright Canada LLP

(57) ABSTRACT

Methods and systems for operating an on-off valve coupled to a system for regulating a system parameter are described herein. The method comprises setting an upper limit on a duty cycle of a pulse width modulation (PWM) signal for controlling the valve, generating the PWM signal with the duty cycle less than or equal to the upper limit and applying the PWM signal to the valve, monitoring the system parameter as the PWM signal is applied, and increasing the upper limit on the duty cycle over time until the system parameter reaches a target.

18 Claims, 9 Drawing Sheets

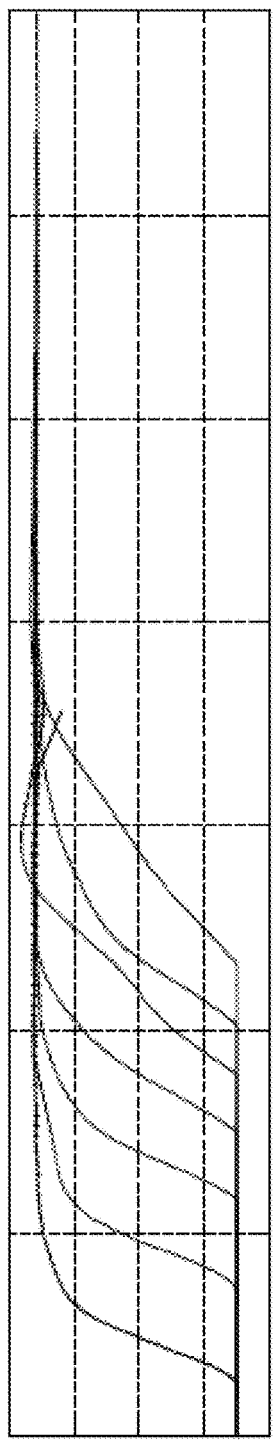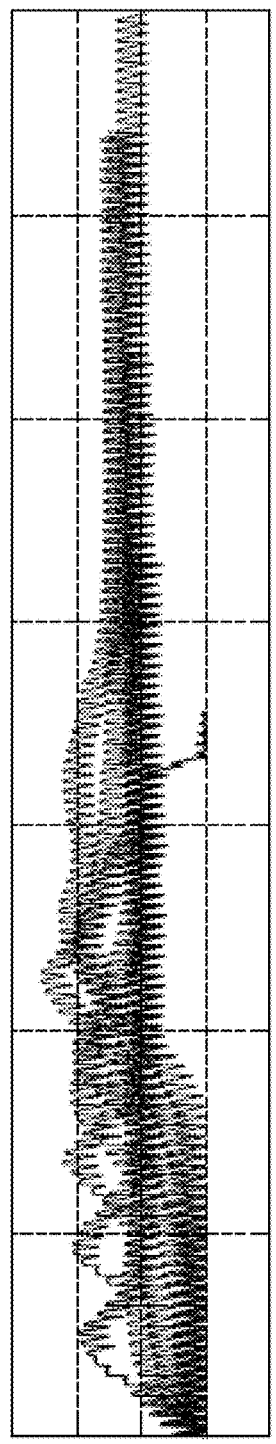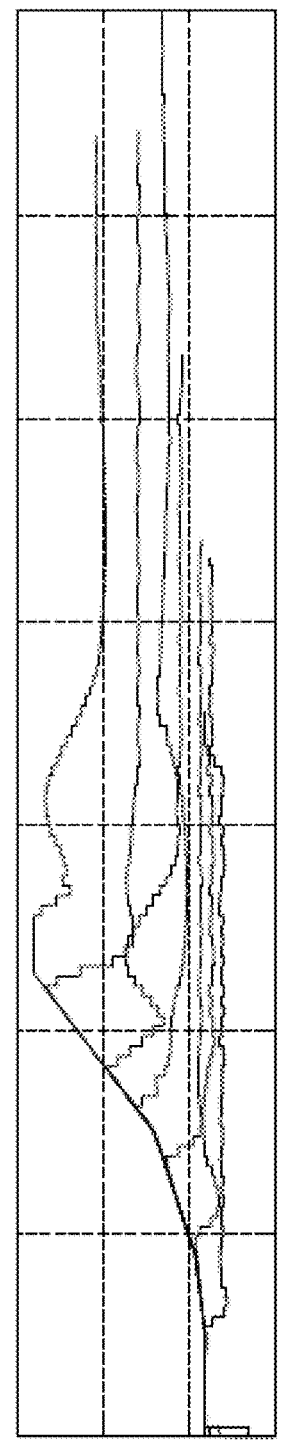

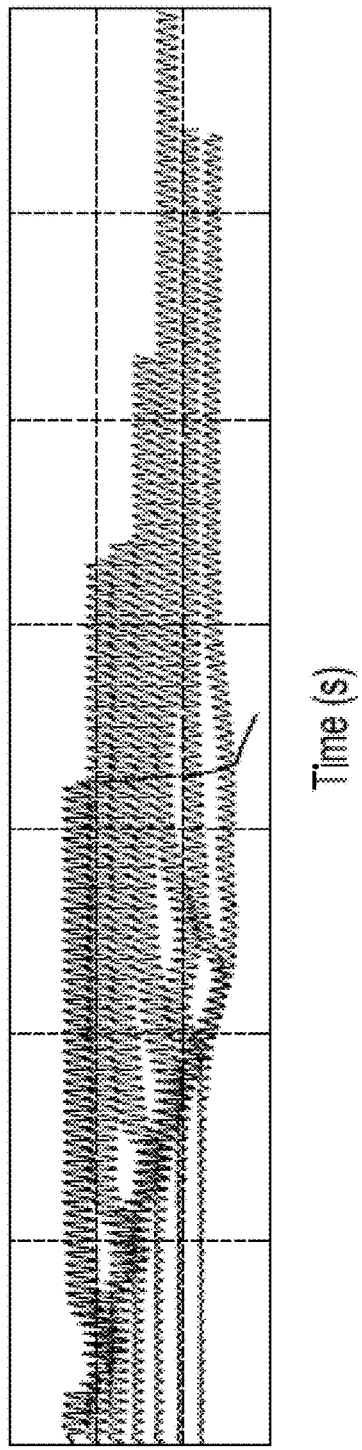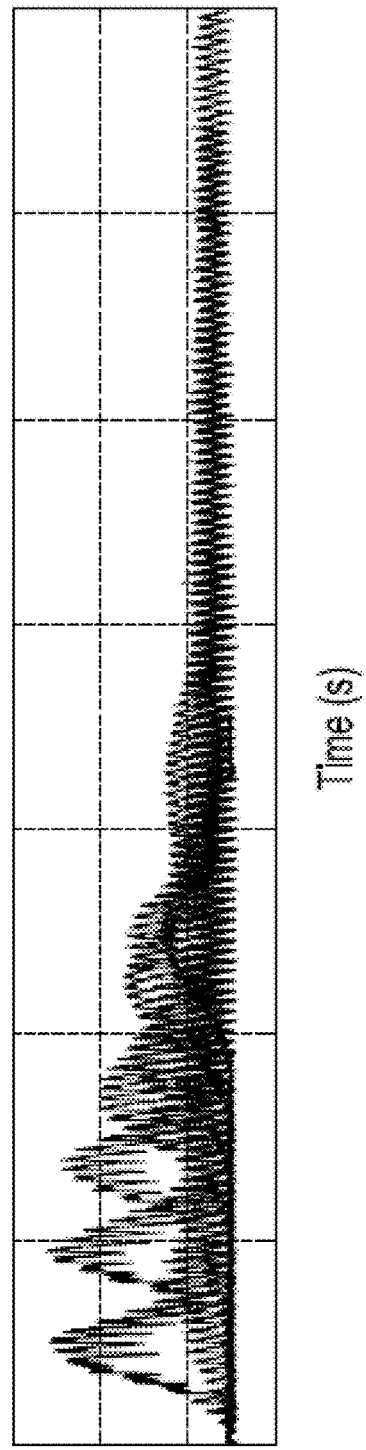

SYSTEMS AND METHODS FOR OPERATING AN ON-OFF VALVE

CROSS-REFERENCE TO RELATED APPLICATIONS

The present application claims the benefit of U.S. Patent Application No. 62/951,493 filed on Dec. 20, 2019, the contents of which are hereby incorporated by reference.

TECHNICAL FIELD

The present disclosure relates generally to the operation and control of on-off valves, and more particularly to an on-off valve coupled to a system for regulating a parameter of the system.

BACKGROUND OF THE ART

Many systems use valves to control or regulate one or more parameters of the system, such as an air starter valve coupled to an engine for performing rotor spinning at low speeds when starting the engine. Since the valve regulates an engine parameter, accuracy is important to the proper functioning of the system.

Therefore, improvements are needed.

SUMMARY

In accordance with a broad aspect, there is provided a method for operating an on-off valve coupled to a system for regulating a system parameter. The method comprises setting an upper limit on a duty cycle of a pulse width modulation (PWM) signal for controlling the valve, generating the PWM signal with the duty cycle less than or equal to the upper limit and applying the PWM signal to the valve, monitoring the system parameter as the PWM signal is applied, and increasing the upper limit on the duty cycle over time until the system parameter reaches a target.

In accordance with another broad aspect, there is provided a system for operating an on-off valve coupled to a system for regulating a system parameter. The system comprises a processing unit and a non-transitory computer readable medium having stored thereon program instructions. The program instructions are executable by the processing unit for setting an upper limit on a duty cycle of a pulse width modulation (PWM) signal for controlling the valve, generating the PWM signal with the duty cycle less than or equal to the upper limit and applying the PWM signal to the valve, monitoring the system parameter as the PWM signal is applied, and increasing the upper limit on the duty cycle over time until the system parameter reaches a target.

In accordance with yet another broad aspect, there is provided a system comprising an engine comprising at least one rotor, a solenoid valve coupled to the engine, and a control system coupled to the solenoid valve and to the engine. The control system is configured for setting an upper limit on a duty cycle of a pulse width modulation (PWM) signal for controlling the solenoid valve, generating the PWM signal with the duty cycle less than or equal to the upper limit and applying the PWM signal to the solenoid valve, monitoring a parameter of the engine as the PWM signal is applied, and increasing the upper limit on the duty cycle over time until the parameter of the engine reaches a target.

Features of the systems, devices, and methods described herein may be used in various combinations, in accordance with the embodiments described herein.

BRIEF DESCRIPTION OF THE DRAWINGS

Reference is now made to the accompanying figures in which:

FIGS. 6A-6E are graphs showing example parameters of the system of FIG. 2 as applied to control the rotor speed of a gas turbine engine;

It will be noted that throughout the appended drawings, like features are identified by like reference numerals.

DETAILED DESCRIPTION

There is described herein methods and systems for operating a valve coupled to a system without knowledge of the pressure at the inlet of the valve. The valve is used to control a system parameter affected by the valve position through feedback control. In some embodiments, the system is an engine. The engine parameter may be engine rotor speed, engine pressure, engine temperature, and any other engine parameter affected by the position of the valve. The methods and systems described herein may also be applicable to other systems, such as aircraft, aircraft environmental control systems, anti-ice systems, oil systems, fuel systems and hydraulic control of bleed valves, variable stator vanes and active clearance control, as well as other pneumatic and hydraulic systems not limited to the aerospace industry.

Figure 1:
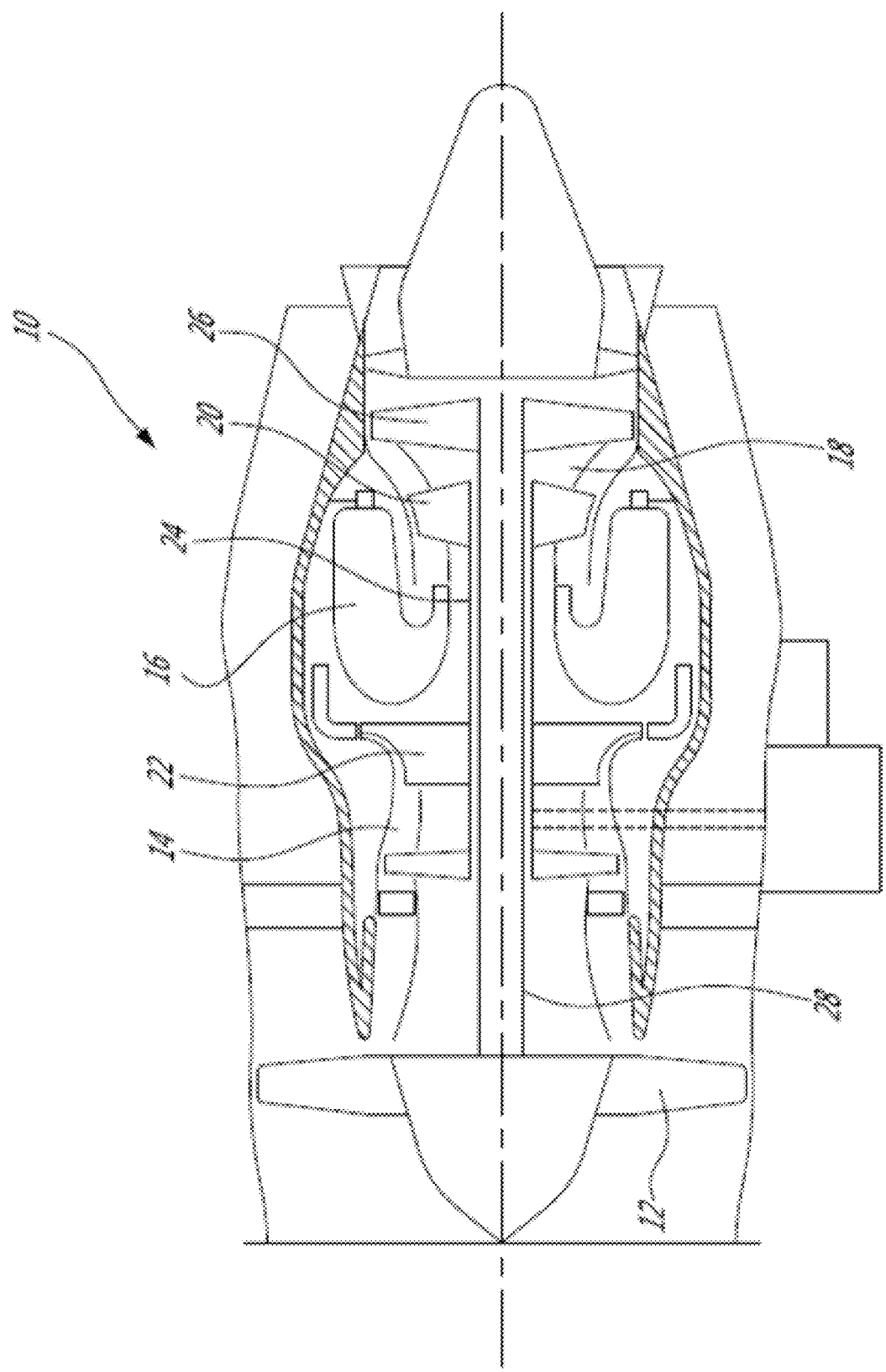
FIG. 1 is a schematic cross-sectional view of an example gas turbine engine.

FIG. 1 illustrates a gas turbine engine 10 generally comprising in serial flow communication, a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. High pressure rotor(s) 20 of the turbine section 18 are drivingly engaged to high pressure rotor(s) 22 of the compressor section 14 through a high pressure shaft 24. Low pressure rotor(s) 26 of the turbine section 18 are drivingly engaged to the fan rotor 12 and to other low pressure rotor(s) (not shown) of the compressor section 14 through a low pressure shaft 28 extending within the high pressure shaft 24 and rotating independently therefrom.

Although illustrated as a turbofan engine, the gas turbine engine 10 may alternatively be another type of engine, for example a turboshaft engine, also generally comprising in serial flow communication a compressor section, a combustor, and a turbine section, and a fan through which ambient air is propelled. A turboprop engine may also apply. The engine may also be another type of engine, such as an electric engine, a piston engine, and the like.

Figure 2:
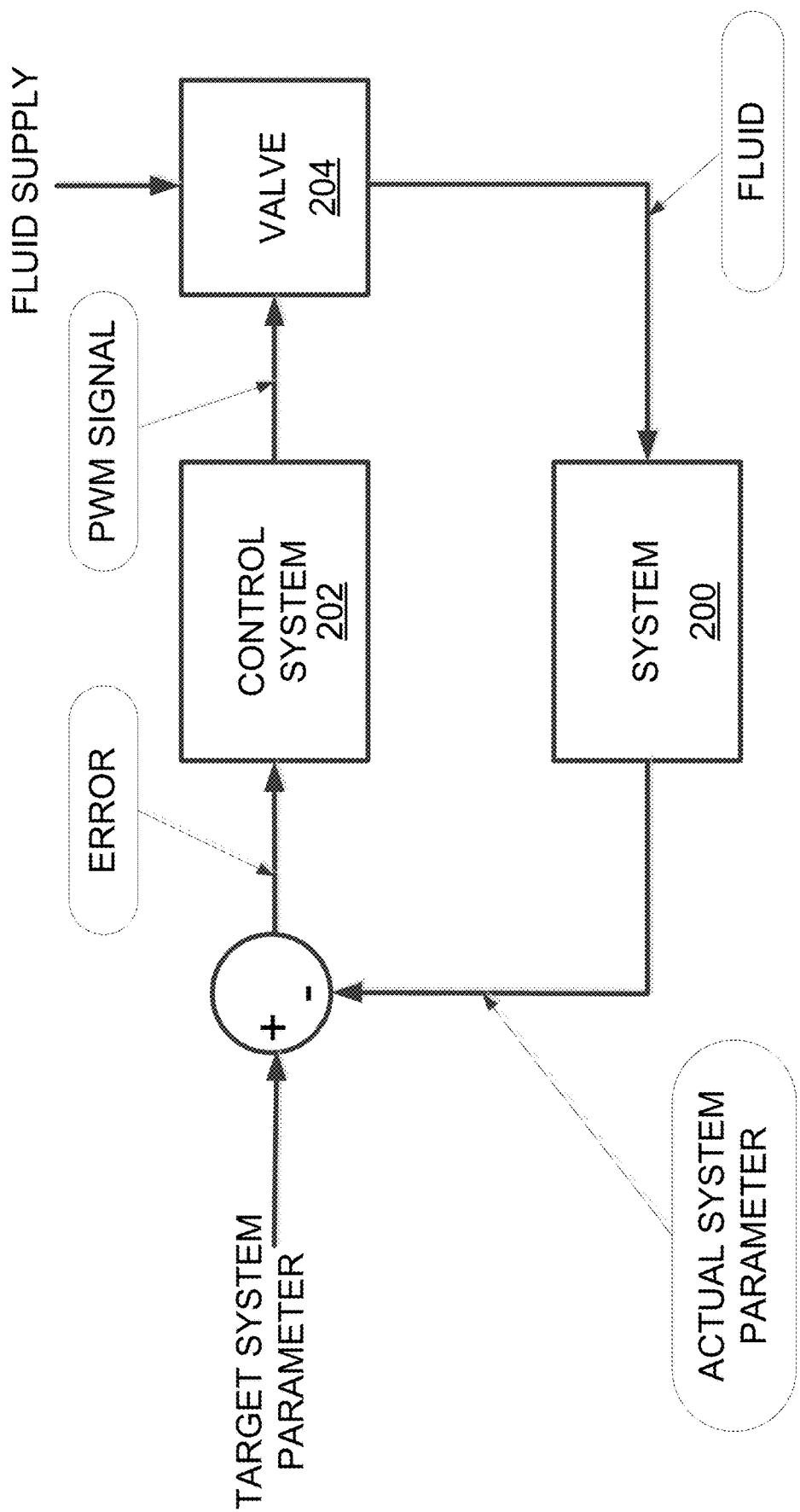
FIG. 2 is a block diagram of an example system incorporating the on-off valve.

Referring now to FIG. 2, a system 200 is coupled to a valve 204, operated by a control system 202. The system 200, which may be the gas turbine engine 10, is downstream from the valve 204 and the position of the valve 204 has an impact on at least one system parameter. More particularly, the position of the valve 204 determines how much fluid is allowed to flow therethrough into the system 200, thus causing at least one system parameter to vary. In some embodiments, the valve 204 is a solenoid air valve that uses pneumatic regulation to provide enough force to keep the valve closed when not energized and to open a fluid pathway when energized, in order to regulate downstream pressure and a pressure rate. The valve 204 may be regulated to an intermediate position by rapidly alternating between its energized and non-energized states, using pulse width modulation (PWM). The control system 202 generates a PWM signal and applies the signal to the valve 204 to control its position. The intermediate valve position can be altered by increasing or decreasing the duty cycle of the PWM signal.

The actual system parameter, which may be measured or calculated based on other system parameters, is compared to a target system parameter. An error corresponding to a difference between the actual system parameter and the target system parameter is provided to the control system 202. The control system 202 adjusts the duty cycle of the PWM signal based on the error.

When regulating certain system parameters affected by the valve position through feedback control, the initial error between the target system parameter and the actual system parameter sometimes results in the duty cycle of the valve being fully saturated at 100%, which fully opens the valve. In such circumstances, certain undesirable effects may be observed, caused by an over correction of the valve position. These undesirable effects may cause the valve to hunt for a certain period of time, before stability is re-established and the regulation of the system parameter is achieved.

In order to mitigate the undesired behavior, and to control the valve regardless of the inlet pressure, the control system 202 is configured to set an upper limit on the duty cycle of the PWM signal. The upper limit may be set to an initially low value and gradually increased over time. Having a maximum duty cycle on the PWM signal prevents the valve from opening too far and helps reduce the phase difference between the valve and the system parameter being controlled, such that a smooth transient response of the valve and the system parameter can be achieved.

Figure 3:
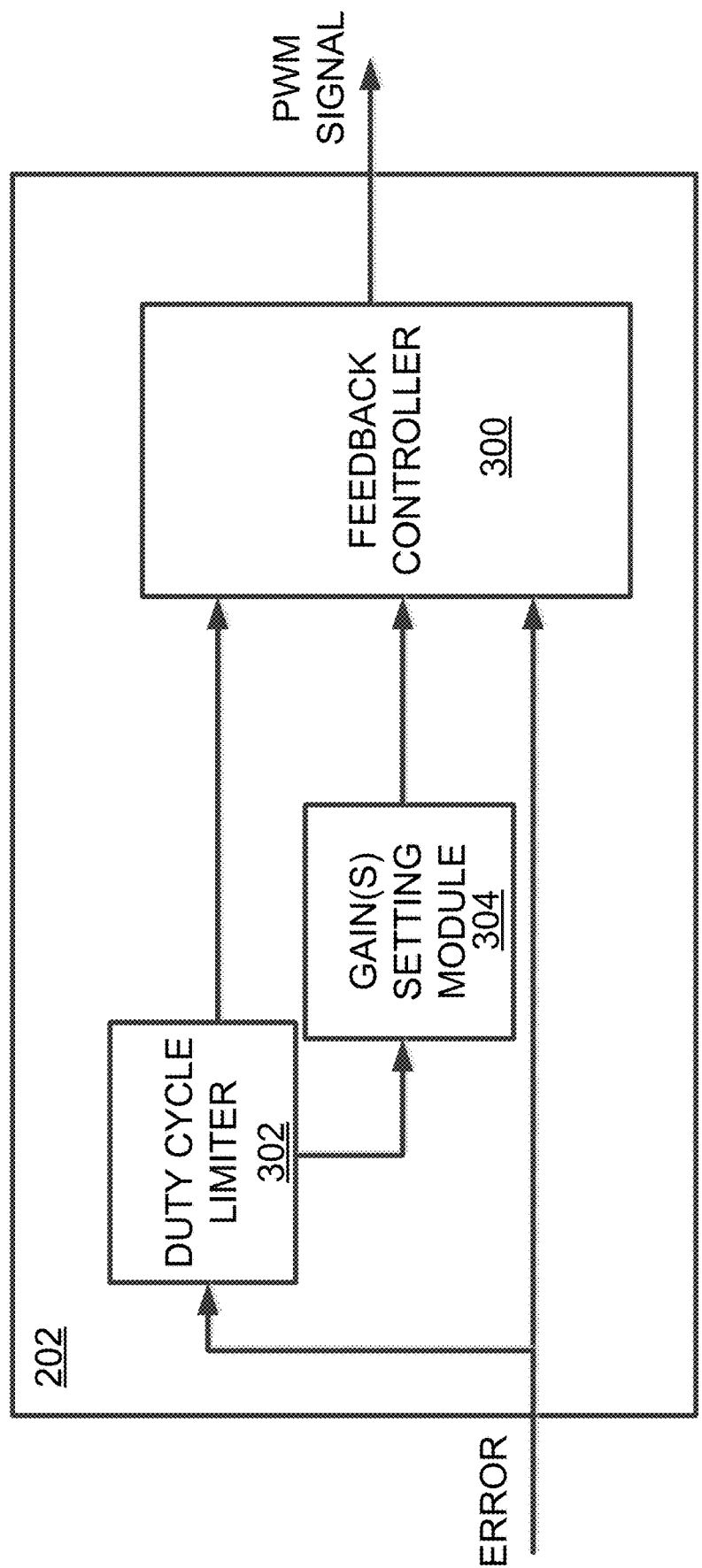
FIG. 3 is a block diagram of an example embodiment of the control system of FIG. 2.

FIG. 3 illustrates an example embodiment of the control system 202, for generating the PWM signal. The error is received at a feedback controller 300, which may be implemented in various manners, for example through a single control mode of proportional, integral, or derivative. The feedback controller 300 may also be implemented using a combination of control modes, such as proportional-integral (PI), proportional-derivative (PD), and proportional-integral-derivative (PID). Other combinations are also possible, and it will be understood that other types of feedback controllers 300 may be used, such as a linear quadratic regulator.

A duty cycle limiter 302 also receives the error signal, determined from the difference between the actual system parameter and the target system parameter. Alternatively, the duty cycle limiter 302 may receive the actual system parameter and the target system parameter directly. The duty cycle limiter 302 sets the upper limit on the duty cycle of the PWM signal to an initial value, and gradually increases the upper limit over time.

Figure 4:
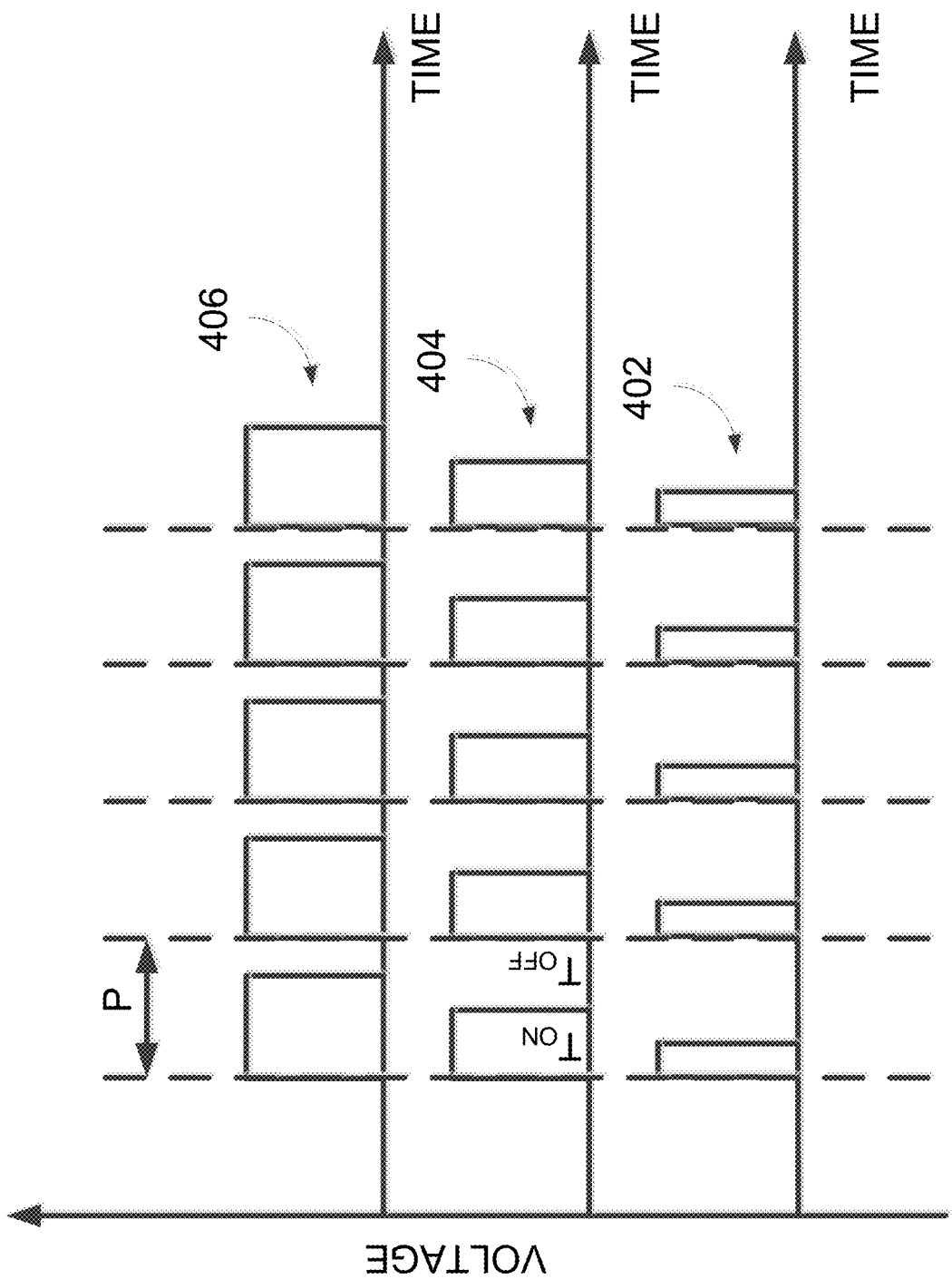
FIG. 4 is a graph showing examples of PWM signals with different duty cycles.

Referring to FIG. 4, there are illustrated example PWM signals 402, 404, 406, having different duty cycles. The duty cycle refers to the percentage of time when the signal is high ($T_{ON}$) over the period (P) of the signal. The period (P) is the sum of high time ($T_{ON}$) and low time ($T_{OFF}$) of a cycle of the signal. In the example of FIG. 4, PWM signal 402 has a duty cycle of 25%, PWM signal 404 has a duty cycle of 50%, and PWM signal 406 has a duty cycle of 75%. These values are for illustrative purposes only.

Referring back to FIG. 3, the feedback controller 300 receives the upper limit for the duty cycle from the duty cycle limiter 302. The feedback controller 300 generates the PWM signal in accordance with the error as received, with a duty cycle that does not exceed the upper limit. In other words, the duty cycle of the PWM signal may be set to a suitable value for causing the valve 204 to operate at a given intermediate position, without exceeding the upper limit of the duty cycle.

The feedback controller 300 applies one or more gain to the error in order to generate the PWM signal. In some embodiments, the control system 202 comprises a gain(s) setting module 304, which is coupled to the duty cycle limiter 302 and uses the upper limit on the duty cycle to set the one or more gain used by the feedback controller 300 to generate the PWM signal. For example, if the feedback controller 300 is a PI controller, the gain(s) setting module will set a proportional gain and an integral gain for the feedback controller 300. Alternatively, the controller gains may be determined internally to the feedback controller 300.

In some embodiments, as the duty cycle limiter 302 gradually increases the upper limit of the duty cycle, the gain(s) setting module 304 also adjusts the controller gains. Indeed, the compensation applied by the feedback controller 300 may be tailored to the changing dynamics of the system 200, caused by the change in pressure at the valve 204. As the upper limit on the duty cycle increases, the pressure at the inlet of the valve 204 decreases. The gain(s) setting module 304 may use the upper limit on the duty cycle, as received from the duty cycle limiter 302, as an indication of the inlet pressure and adjust the controller gains accordingly. A lookup table, equation, or other mechanism may be used by the gain(s) setting module 304 to output new controller gains as a function of a new upper limit on the duty cycle.

The duty cycle limiter 302 may be designed for various pressure ranges. For example, the duty cycle limiter 302 may be designed for any pressure range, or for the pressure range of the valve 204. The pressure range may be separated into multiple sub-ranges, with each sub-range having a given upper limit associated thereto. An example is illustrated in Table 1.

TABLE 1

| VALVE PRESSURE | UPPER LIMIT ON DUTY CYCLE | DURATION |
|---|---|---|
| 20 psi-30 psi | 25% | 3 ms |
| 31 psi-43 psi | 50% | 3 ms |
| 44 psi-52 psi | 75% | 5 ms |
| 53 psi-65 psi | 100% | — |

In the example of Table 1, the duty cycle limiter 302 is designed for a pressure range of 20 psi to 65 psi and four different upper limits are associated with subsets of the pressure range. The subsets may be of a same or different size. More or less than four subsets may be used, and the values found in Table 1 are for illustrative purposes only. The duty cycle limiter 302 initially sets the upper limit to 25%. The duty cycle limiter 302 determines from the error whether the target system parameter has been reached. If after a first duration of time, for example 3 ms, the target system parameter has not been reached, the upper limit is increased to 50%. The gain(s) setting module 304 receives the updated upper limit of 50% and retrieves the associated pressure range subset of 31 psi-43 psi. The gain(s) setting module 304 applies a new schedule for the controller gains based on the associated pressure range subset. The duty cycle limiter 302 continues to receive the error and monitor the system parameter. If after a second duration of time, which may be the same as the first duration of time or different, the system parameter has not been reached, then the upper limit is increased to 75%. The control system 202 continues to self-adapt to the dynamic changes in the system 200, until the target system parameter has been reached.

Figure 5:
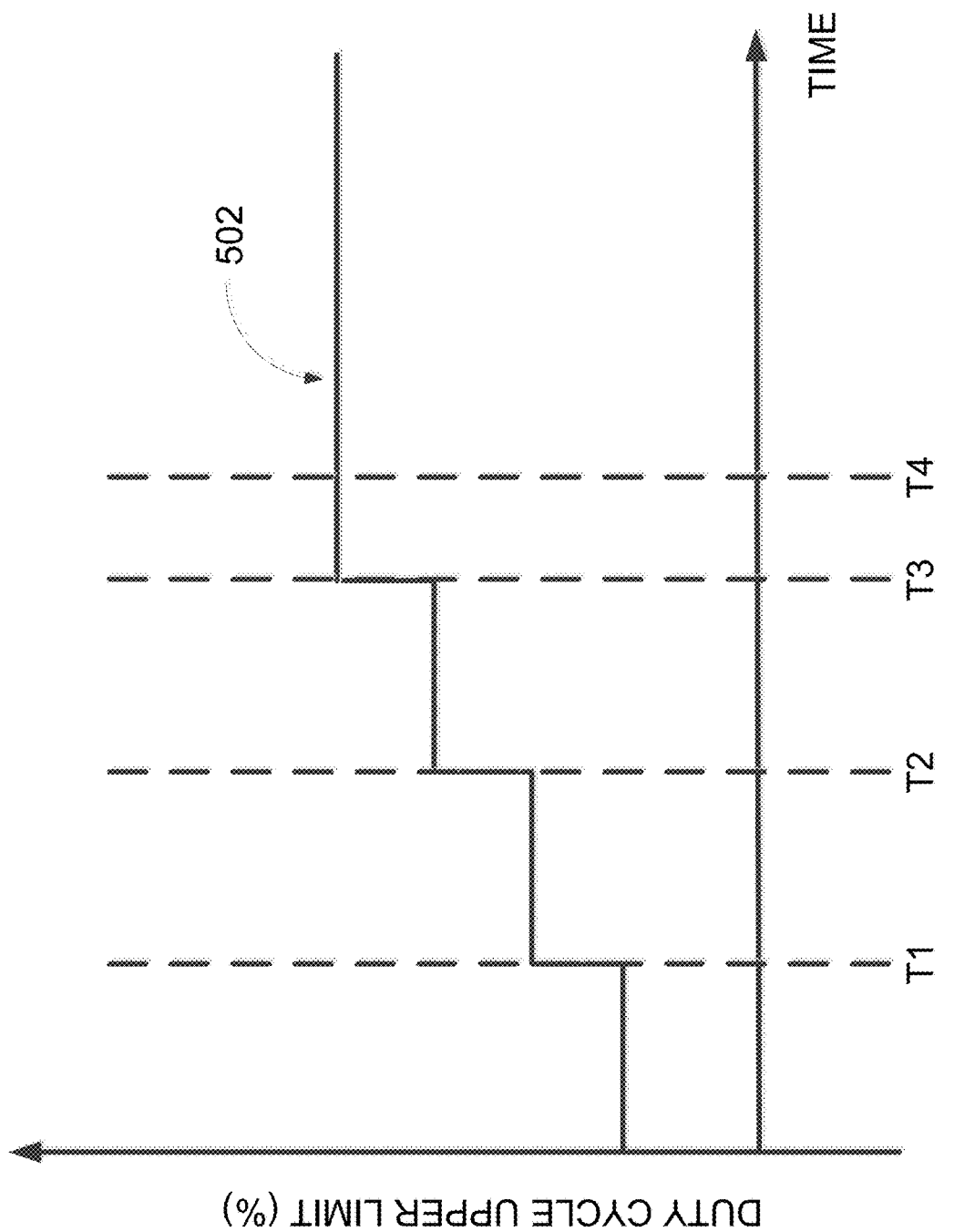
FIG. 5 is a graph showing an example of a duty cycle upper limit over time.

FIG. 5 graphically illustrates the changes to the upper limit on the duty cycle over time. Curve 502 is shown to increase in a stepwise manner at times T1, T2, and T3. At time T4, the system parameter reaches its target and the upper limit on the duty cycle remains constant. Although illustrated as a step function, other types of functions may be used for the increase on the upper limit of the duty cycle. For example, instead of increasing using discrete steps, the increase may be continuous, either linearly or non-linearly. Suitable values for the upper limit of the duty cycle and the duration of time for which each limit is held may be found empirically or analytically, using tests or simulations. Similarly, suitable controller gains for corresponding inlet pressures may be found empirically or analytically, using tests or simulations. Data obtained through testing and/or simulations may be stored in one or more storage medium, for example in a lookup table, accessible by the duty cycle limiter 302, gain(s) setting module 304, and/or feedback controller 300. Alternatively, functions may solved in real or pseudo-real time by the duty cycle limiter 302, gain(s) setting module 304, and/or feedback controller 300 so as to determine control parameters for the control system 202.

FIGS. 6A-E are graphs showing the control of an engine's inner rotor through the adaptive control of the pulse width modulated duty cycle through a range of expected inlet pressures. FIG. 6A illustrates the speed of the inner rotor over time, for a plurality of starter inlet pressures, i.e. each curve is a controlled engine response with a given starter inlet pressure, where the highest pressure results in the fastest response and the lowest pressure results in the lowest response. FIG. 6B illustrates the position of the valve (a solenoid air valve) over time, for a plurality of starter inlet pressures. FIG. 6C illustrates the actual maximum duty cycle of the PWM signal over time, for a plurality of starter inlet pressures. FIG. 6D illustrates the inlet pressure of the valve over time, for a plurality of starter inlet pressures. FIG. 6E illustrates the output pressure of the valve over time, for a plurality of starter inlet pressures. As can be seen from the graphs, the adaptive control of the duty cycle upper limit provides an optimal transient and steady state response for the system.

Figure 7:
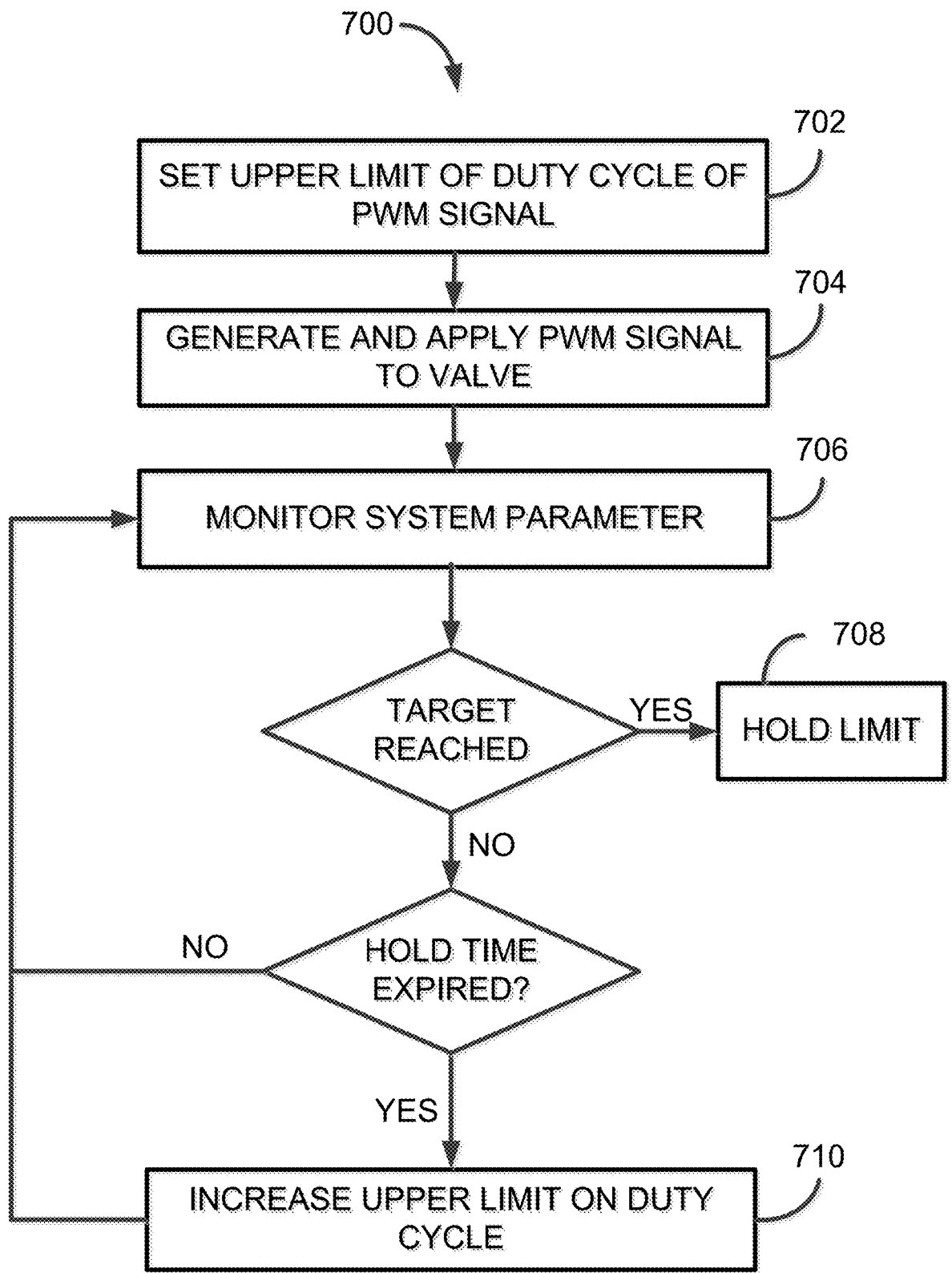
FIG. 7 is a flowchart of an example method for operating an on-off valve.

Turning to FIG. 7, there is provided a flowchart of a method 700 for operating an on-off valve coupled to a system for regulating a system parameter. The method 700 may be performed by a control system, such as control system 202, for controlling valve 204 coupled to system 200. As stated above, in some embodiments, the valve is a solenoid air valve and the system is a gas turbine engine. Other systems and types of valves are also applicable.

At step 702, an initial upper limit is set for a duty cycle of a PWM signal to be applied to the valve for controlling a position thereof. The initial upper limit may be predetermined. The initial upper limit may also be determined in real or pseudo-real time, using one or more input parameters. For example, the pressure range of the valve to which the PWM signal will be applied may be used to determine the initial upper limit for the duty cycle.

At step 704, the PWM signal is generated and applied to the valve. The PWM signal may be generated, for example, by a feedback controller, such as the feedback controller 300 of the control system 202. In some embodiments, controller gains are also determined and/or set using the upper limit of the duty cycle, for example by the gain(s) setting module 304 or by the feedback controller 300.

At step 706, the system parameter influenced by the position of the valve is monitored. The system parameter may be any parameter of the system influenced or affected by the position of the valve, such as but not limited to engine rotor speed, engine temperature, engine pressure, fuel flow, oil flow, and the like. In some embodiments, if the system parameter reaches a target parameter, the upper limit on the duty cycle is held at step 708. If the target parameter has not been reached and a duration of time for holding the upper limit has expired, the upper limit on the duty cycle is increased at step 710. In some embodiments, the upper limit is increased at least once after a first duration of time has expired and the target parameter has not been reached. In some embodiments, the upper limit is increased in a stepwise manner, over set time intervals of a same or different duration, to predetermined discrete values. Each increase from one discrete value to another may be of a same or different amount. The increase may also be continuous over time, using a linear or non-linear function. In some embodiments, a defined schedule vs time is used to increase the upper limit on the duty cycle. In some embodiments, the error, or difference between the actual system parameter and target system parameter, is used to determine the increase in the upper limit of the duty cycle over time. A fixed duration of time for holding the limit may be omitted if the increase is based only on the error.

In some embodiments, the method 700 further comprises a step of setting one or more gain or limit (such as a lower limit) of a feedback controller generating the PWM signal as a function of the upper limit on the duty cycle. In some embodiments, the one or more gain may also be adjusted or modified as the upper limit on the duty cycle is increased.

Figure 8:
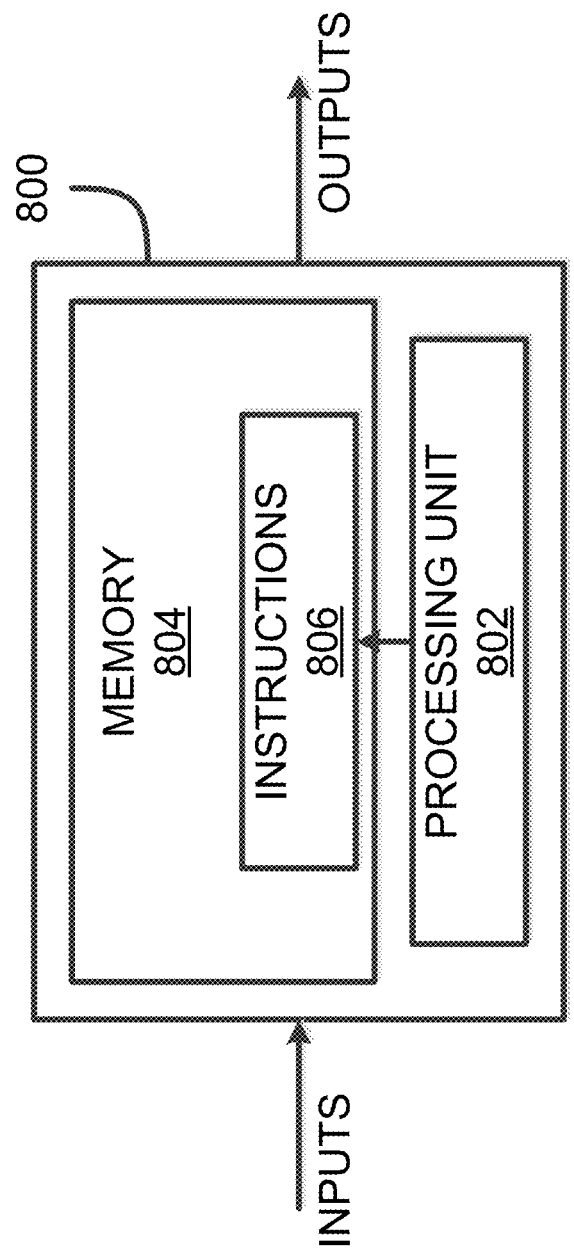
FIG. 8 is a block diagram of an example computing device for implementing the system of FIG. 7.

With reference to FIG. 8, an example of a computing device 800 for implemented the method 700 is illustrated. For example, the control system 202 may be implemented with one or more computing devices 800. Note that the control system 202 can be implemented as part of a full-authority digital engine controls (FADEC) or other similar device, including electronic engine control (EEC), engine control unit (ECU), electronic propeller control, propeller control unit, and the like. Other embodiments may also apply.

The computing device 800 comprises a processing unit 802 and a memory 804 which has stored therein computer-executable instructions 806. The processing unit 802 may comprise any suitable devices configured to implement the method 700 such that instructions 806, when executed by the computing device 800 or other programmable apparatus, may cause the functions/acts/steps performed as part of the method 700 as described herein to be executed. The processing unit 802 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 804 may comprise any suitable known or other machine-readable storage medium. The memory 804 may comprise non-transitory computer readable storage medium, for example, but not limited to, an electronic, magnetic, optical, electromagnetic, infrared, or semiconductor system, apparatus, or device, or any suitable combination of the foregoing. The memory 804 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 804 may comprise any storage means (e.g., devices) suitable for retrievably storing machine-readable instructions 806 executable by processing unit 802.

The methods and systems for operating an on-off valve described herein may be implemented in a high level procedural or object oriented programming or scripting language, or a combination thereof, to communicate with or assist in the operation of a computer system, for example the computing device 800. Alternatively, the methods and systems for operating an on-off valve may be implemented in assembly or machine language. The language may be a compiled or interpreted language. Program code for implementing the methods and systems for operating an on-off valve may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for operating an on-off valve may also be considered to be implemented by way of a non-transitory computer-readable storage medium having a computer program stored thereon. The computer program may comprise computer-readable instructions which cause a computer, or more specifically the processing unit 802 of the computing device 800, to operate in a specific and predefined manner to perform the functions described herein, for example those described in the method 700.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described in this document provide non-limiting examples of possible implementations of the present technology. Upon review of the present disclosure, a person of ordinary skill in the art will recognize that changes may be made to the embodiments described herein without departing from the scope of the present technology. Examples of such changes include, but are not limited to, the size of the steps used to increase the upper limit of the duty cycle, the number of steps, the values associated with each step, the duration each limit is held for, and the like. Yet further modifications could be implemented by a person of ordinary skill in the art in view of the present disclosure, which modifications would be within the scope of the present technology.

The invention claimed is:

1. A method for operating an on-off valve coupled to a system for regulating a system parameter, the method comprising:
    setting an initial value of an upper limit on a duty cycle of a pulse width modulation (PWM) signal for controlling the valve, the initial value of the upper limit being lower than 100% which fully opens the valve;
    receiving an error between a target for the system parameter and an actual value of the system parameter;
    based on the error, generating the PWM signal without exceeding the initial value of the upper limit on the duty cycle and applying the PWM signal to the valve to regulate the system parameter, wherein variations in the PWM signal cause variations in a flow rate through the on-off valve, said variations in the flow rate through the on-off valve further directly affected by variations in a pressure at an inlet of the on-off valve, the variations in the flow rate through the on-off valve causing variations in the system parameter;
    monitoring the variations in the system parameter for a duration of time as the PWM signal is applied to the valve;
    determining whether the target for the system parameter has been reached after the duration of time;
    when the target for the system parameter has not been reached after the duration of time:
        increasing the upper limit on the duty cycle to a subsequent value greater than the initial value; and
        generating the PWM signal without exceeding the subsequent value of the upper limit on the duty cycle and applying the PWM signal to the valve.

2. The method of claim 1, wherein increasing the upper limit on the duty cycle comprises increasing the upper limit to predetermined discrete values over set time intervals when the system parameter is below the target.

3. The method of claim 1, further comprising setting one or more gains of a feedback controller generating the PWM signal as a function of the upper limit on the duty cycle.

4. The method of claim 3, further comprising modifying the one or more gains of the feedback controller as the upper limit on the duty cycle is increased.

5. The method of claim 1, wherein the system is an engine.

6. The method of claim 5, wherein the valve is a starter air valve.

7. The method of claim 6, wherein the system parameter comprises one of: a rotor speed of the engine, an engine temperature, an engine pressure, a fuel flow, or an oil flow.

8. The method as defined in claim 1, comprising selecting the initial value of the upper limit based on an expected range of the pressure at the inlet of the on-off valve.

9. A system for operating an on-off valve coupled to a system for regulating a system parameter, the system comprising:
    a processing unit; and
    a non-transitory computer readable medium having stored thereon program instructions executable by the processing unit for:
        setting an initial value of an upper limit on a duty cycle of a pulse width modulation (PWM) signal for controlling the valve, the initial value of the upper limit being lower than 100% which fully opens the valve;

determining an error between a target for the system parameter and an actual value of the system parameter;

based on the error, generating the PWM signal without exceeding the initial value of the upper limit on the duty cycle and applying the PWM signal to the valve to regulate the system parameter, wherein variations in the PWM signal cause variations in a flow rate through the on-off valve, said variations in the flow rate through the on-off valve further directly affected by variations in a pressure upstream of the on-off valve, the variations in the flow rate through the on-off valve causing variations in the system parameter;

monitoring the variations in the system parameter for a duration of time as the PWM signal is applied to the valve;

determining whether the target for the system parameter has been reached after the duration of time;

when the target for the system parameter has not been reached after the duration of time:
increasing the upper limit on the duty cycle to a subsequent value greater than the initial value; and
generating the PWM signal without exceeding the subsequent value of the upper limit on the duty cycle and applying the PWM signal to the valve.

10. The system of claim 9, wherein increasing the upper limit on the duty cycle comprises increasing the upper limit to predetermined discrete values over set time intervals when the system parameter is below the target.

11. The system of claim 9, further comprising setting one or more gains of a feedback controller generating the PWM signal as a function of the upper limit on the duty cycle.

12. The system of claim 11, further comprising modifying the one or more gains of the feedback controller as the upper limit on the duty cycle is increased.

13. The system of claim 9, wherein the system is an engine.

14. The system of claim 13, wherein the valve is a starter air valve.

15. The system of claim 14, wherein the system parameter comprises one of: an engine rotor speed, an engine temperature, an engine pressure, a fuel flow, or an oil flow.

16. A system comprising:
an engine comprising at least one rotor;
a solenoid valve coupled to the engine for regulating a parameter of the engine; and
a control system coupled to the solenoid valve and to the engine and configured for:
setting an initial value of an upper limit on a duty cycle of a pulse width modulation (PWM) signal for controlling the solenoid valve, the upper limit on the duty cycle defined as: a maximum period of time where a pulse of the PWM signal is high divided by a period of time of a cycle of the PWM signal, the initial value of the upper limit being lower than 100% which fully opens the valve;
determining an error between a target for the parameter and an actual value of the parameter;
based on the error, generating the PWM signal without exceeding the initial value of the upper limit on the duty cycle and applying the PWM signal to the solenoid valve;
monitoring the parameter of the engine for a duration of time as the PWM signal is applied to the solenoid valve;
determining whether a target for the parameter has been reached after the duration of time;
when the target for the parameter has not been reached after the duration of time:
increasing the upper limit on the duty cycle to a subsequent value greater than the initial value; and
generating the PWM signal without exceeding the subsequent value of the upper limit on the duty cycle and applying the PWM signal to the valve.

17. The system of claim 16, wherein increasing the upper limit on the duty cycle comprises increasing the upper limit to predetermined discrete values over set time intervals when the parameter is below the target.

18. The system of claim 16, wherein the parameter is a rotational speed of the at least one rotor of the engine.

* * * * *